Nov. 6, 1945.                L. JERNIGAN                2,388,414
                  EJECTOR AND GUARD FOR CHUCK KEYS
                        Filed May 20, 1944
FIG. 1
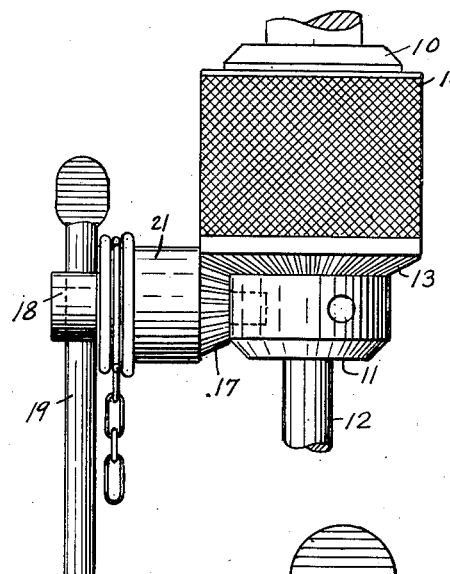
FIG. 2
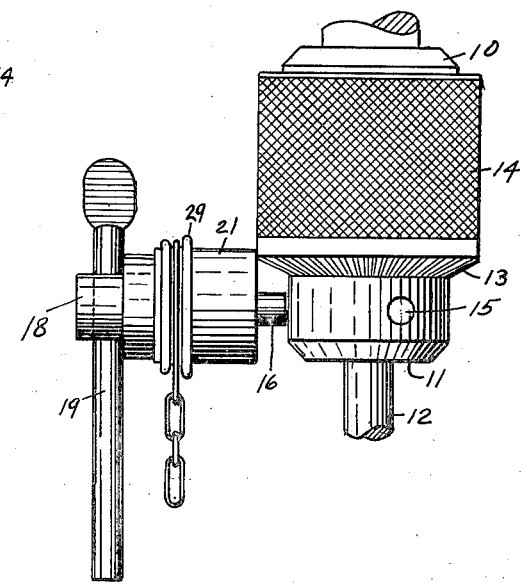
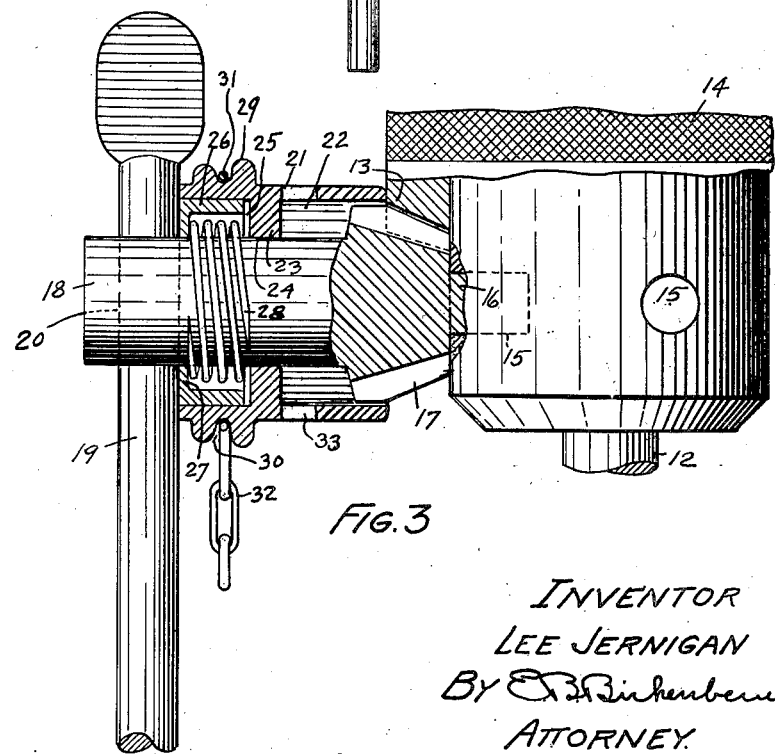
FIG. 3
INVENTOR
LEE JERNIGAN
BY
ATTORNEY Patented Nov. 6, 1945

2,388,414

UNITED STATES PATENT OFFICE 2,388,414

EJECTOR AND GUARD FOR CHUCK KEYS

Lee Jernigan, Portland, Oreg.

Application May 20, 1944, Serial No. 536,525

1 Claim. (Cl. 81—90)

This invention relates generally to machine tools and particularly an ejector and guard for chuck keys.

The main object of this invention is to provide an extraordinarily simple and efficient form of chuck key in which is incorporated a means for automatically disengaging the key from the chuck the moment the hand is released therefrom.

The second object is to provide a guard for the teeth in the driving pinion of the key.

The third object is to reduce the number of accidents commonly occurring due to the failure to remove the chuck key from the chuck before applying power to the chuck.

The fourth object is to construct a device of the class described which will be adaptable for use with chucks on drills, lathes, milling machines and any other machine on which the chuck jaws are actuated by a beveled gear and pinion.

I accomplish these and other objects in a manner set forth in the following specification as illustrated in the accompanying drawing, in which:

Fig. 1 is a side elevation of the device in a driving position.

Fig. 2 is a view similar to Fig. 1 showing the key in a released or ejected position.

Fig. 3 is a longitudinal section through the device.

Similar numbers refer to similar parts throughout the several views.

Referring in detail to the drawing, there is shown a common form of chuck 10 whose jaws 11 are used to hold drills 12 or any other desired tool work. The jaws 11 are normally actuated by means of a ring gear 13, which is integral with the knurled grip 14 of the chuck 10. In the body of the chuck 10 are formed the holes 15 adapted to receive the pivot pin 16 of the chuck driving pinion 17 which is formed on the cylindrical key 18 and provided with an operating lever 19, which passes through the hole 20 in the end of the key 18. The chuck and key thus far described are now in common use.

Referring particularly to my invention, same will be seen to consist of a cylindrical sleeve 21 having an enlarged counter bore 22 sufficiently long and large enough to receive the pinion 17. Along the middle of the length of the sleeve 21 is a reduced portion 23 whose opening 24 is sufficiently large to freely receive the key 18. A second counter bore 25 is formed in the opposite end of the sleeve 21 to receive the bushing 26 whose inturned flange 27 permits the free passage of the key 18. A spring 28 is confined between the flange 27 and the reduced portion 23 of the sleeve 21.

The spring 28 reacts between the sleeve 21 and the lever 19 and urges the sleeve 21 into a position which covers the pinion 17. It is desirable to provide a flange 29 around the sleeve 21 to assist in withdrawing same and it is also desirable to provide a groove 30 around the sleeve 21 to receive the snap ring 31 by means of which the device is secured to a stationary part by means of the chain 32 in order to prevent loss.

The operation of the device is as follows:

It is used in precisely the same manner as is the ordinary chuck key except that it must be held in position when rotating the gear 13. It is evident that any release of pressure will permit the spring 28 to disengage the gear 13 and pinion 17 and move them to the position shown in Fig. 2. It can be seen that by this means, the common danger of accident caused by carelessness or oversight on the part of the workmen by leaving a chuck key in place is eliminated.

It will be understood that the use of this device is not to be limited to any particular form of machine tool, but is useful wherever chucks are operated by geared chuck keys.

It is desirable to provide outlet openings 33 in the sleeve 21 to permit the escape of metal particles which may find their way into the sleeve.

It will be noted that not only does the sleeve 21 protect the operator by automatic disengagement of the parts, but also prevents the fingers from being caught in the gears during the operation thereof.

While I have thus illustrated and described my invention, it is not my desire to be limited to the precise form shown herein, and I intend to cover such forms and modifications of the invention as fall fairly within the appended claim.

I claim:

A chuck key having in combination a pivot, a beveled gear secured near one end of said pivot and a handle secured near the opposite end thereof, a sleeve slidably mounted on said pivot between said pinion and handle, one end of said sleeve being counter-bored to completely receive said pinion and the other end of said sleeve being counter bored to provide a spring containing recess, a bushing extending into said spring recess having an inturned flange slidable upon said pivot and engaging said handle and a spring disposed within said last mentioned recess adapted to urge said sleeve toward a pinion covering position.

LEE JERNIGAN.